United States Patent
Guida

(10) Patent No.: US 10,287,002 B2
(45) Date of Patent: May 14, 2019

(54) WINGTIP DEVICE

(71) Applicant: Tamarack Aerospace Group, Inc., Sandpoint, ID (US)

(72) Inventor: Nicholas R. Guida, Sagle, ID (US)

(73) Assignee: Tamarack Aerospace Group, Inc., Sandpoint, ID (US)

( * ) Notice: Subject to any disclaimer, the term of this patent is extended or adjusted under 35 U.S.C. 154(b) by 893 days.

(21) Appl. No.: 14/562,363

(22) Filed: Dec. 5, 2014

(65) Prior Publication Data

US 2015/0158578 A1 Jun. 11, 2015

Related U.S. Application Data

(60) Provisional application No. 61/912,014, filed on Dec. 5, 2013.

(51) Int. Cl.
*B64C 23/06* (2006.01)

(52) U.S. Cl.
CPC ........... *B64C 23/069* (2017.05); *Y02T 50/164* (2013.01)

(58) Field of Classification Search
CPC .... B64C 23/069; B64C 23/065; Y02T 50/164
USPC ...................................................... 244/199.4
See application file for complete search history.

(56) References Cited

U.S. PATENT DOCUMENTS

| | | | | |
|---|---|---|---|---|
| 4,595,160 A * | 6/1986 | Santos | ................... | B64C 23/069 244/199.4 |
| 5,275,358 A | 1/1994 | Goldhammer et al. | | |
| 5,348,253 A * | 9/1994 | Gratzer | ................. | B64C 23/069 244/91 |
| 7,900,877 B1 | 3/2011 | Guida | | |
| 9,296,472 B2 * | 3/2016 | Thoreen | ................. | B64C 13/04 |
| 9,637,225 B1 * | 5/2017 | Zickuhr | ................ | B64C 23/065 |
| 2002/0092947 A1 * | 7/2002 | Felker | ................... | B64C 23/069 244/35 R |
| 2002/0162917 A1 * | 11/2002 | Heller | ...................... | B64C 3/10 244/199.4 |
| 2004/0262451 A1 * | 12/2004 | McLean | .................... | B64C 3/10 244/45 R |
| 2007/0131821 A1 * | 6/2007 | Johan | ....................... | B64C 3/10 244/91 |
| 2007/0252031 A1 * | 11/2007 | Hackett | .................... | B64C 3/10 244/4 R |

(Continued)

FOREIGN PATENT DOCUMENTS

| | | |
|---|---|---|
| JP | 2012525292 | 10/2012 |
| JP | 2013512153 | 4/2013 |

(Continued)

OTHER PUBLICATIONS

PCT Search Report and Written Opinion dated Mar. 10, 2015 for PCT application No. PCT/US2014/068883.

(Continued)

*Primary Examiner* — Christopher P Ellis
(74) *Attorney, Agent, or Firm* — Lee & Hayes, P.C.

(57) ABSTRACT

A wingtip device may be attached to a baseline wing of an aircraft. The wingtip device may comprise a vertical portion coupled to the baseline wing. The vertical portion may comprise a leading edge and trailing edge. The leading edge and trailing edge may be nonlinear shapes. For example, compound curves, smooth continuous higher order polynomials, or combinations thereof. The leading edge and trailing edge may be shaped as to locate the wingtip device further aft than a conventional winglet design.

7 Claims, 11 Drawing Sheets

(56) References Cited

U.S. PATENT DOCUMENTS

| | | | | |
|---|---|---|---|---|
| 2008/0223991 | A1* | 9/2008 | Mann | B64C 23/069 244/199.4 |
| 2010/0019094 | A1* | 1/2010 | Theurich | B64C 23/065 244/199.4 |
| 2010/0181432 | A1* | 7/2010 | Gratzer | B64C 11/18 244/199.4 |
| 2011/0024573 | A1* | 2/2011 | Kirk | B64C 23/069 244/199.4 |
| 2011/0192937 | A1* | 8/2011 | Buescher | B64C 23/069 244/199.4 |
| 2012/0049010 | A1* | 3/2012 | Speer | B64C 23/065 244/45 R |
| 2012/0112005 | A1* | 5/2012 | Chaussee | B64C 23/065 244/123.1 |
| 2013/0277504 | A1* | 10/2013 | Heller | B64C 23/065 244/35 R |
| 2013/0320150 | A1* | 12/2013 | Reckzeh | B64C 21/02 244/199.4 |
| 2013/0341466 | A1* | 12/2013 | Emunds | B64C 3/58 244/199.4 |

FOREIGN PATENT DOCUMENTS

| | | |
|---|---|---|
| WO | WO2008155566 | 12/2008 |
| WO | WO2009155584 | 12/2009 |
| WO | WO2010124877 | 11/2010 |

OTHER PUBLICATIONS

Extended European Search Report dated Jun. 22, 2017 for European Patent Application No. 14867799.0, 8 pages.

Han, et al., "An adaptive geometry parametrization for aerodynamic shape optimization", Optimization and Engineering, vol. 15, No. 1, Jan. 31, 2013, Springer New York, pp. 69-91.

Japanese Office Action dated Nov. 27, 2018 for Japanese Patent Application No. 2016-536762, a counterpart of U.S. Appl. No. 14/562,363, 9 pages.

* cited by examiner

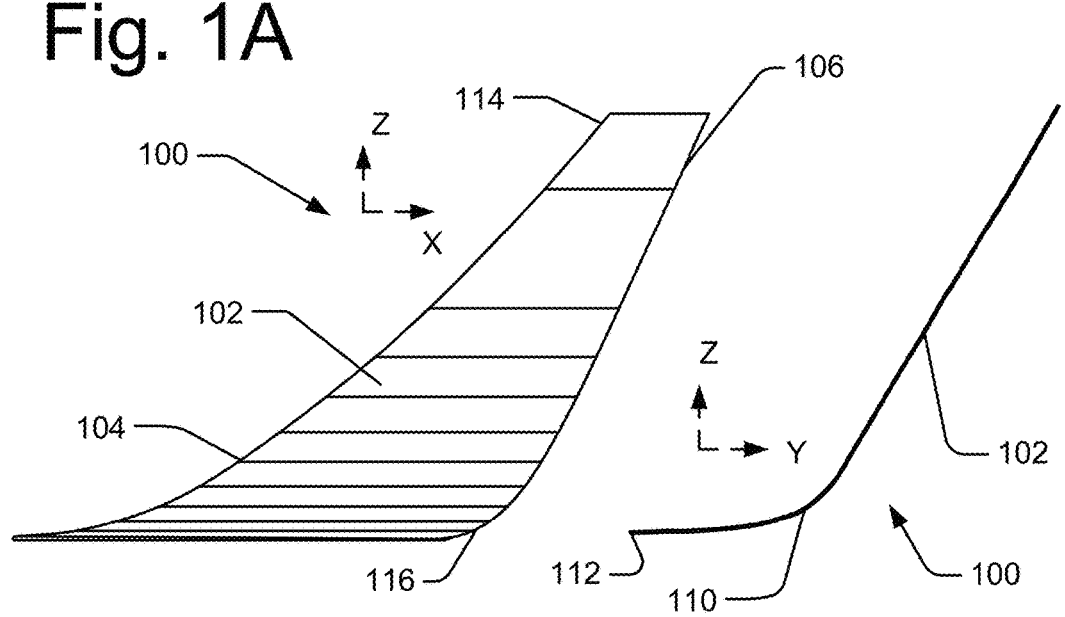
Fig. 1A
Fig. 1B
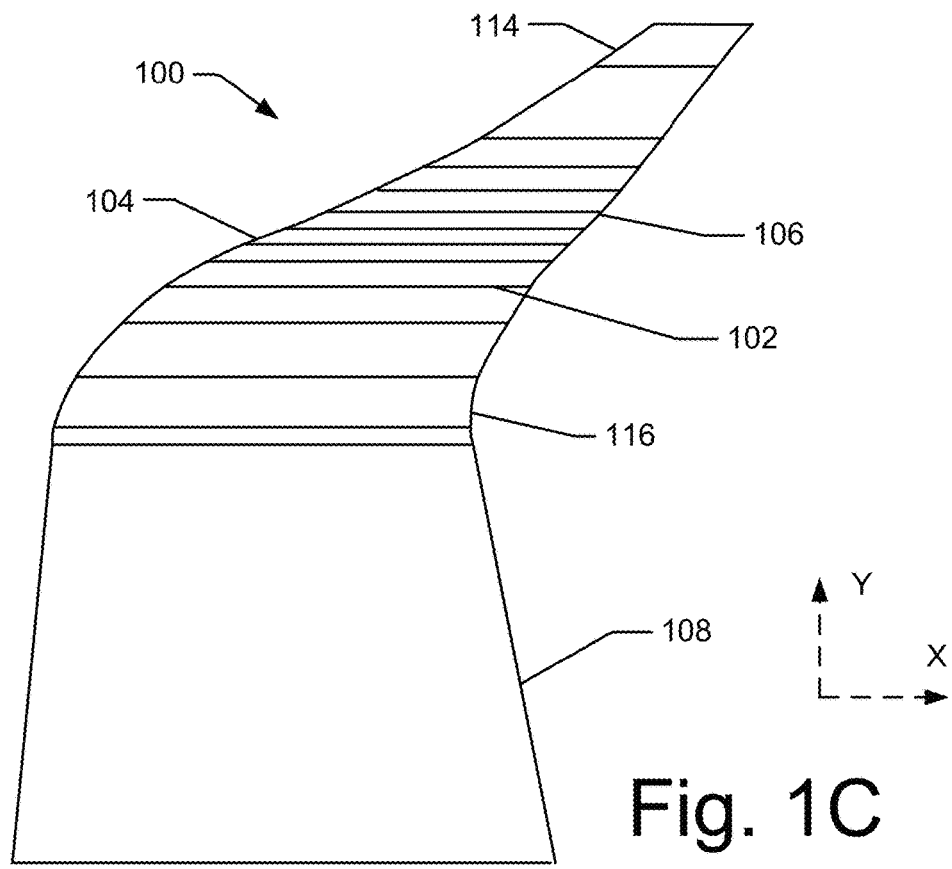
Fig. 1C

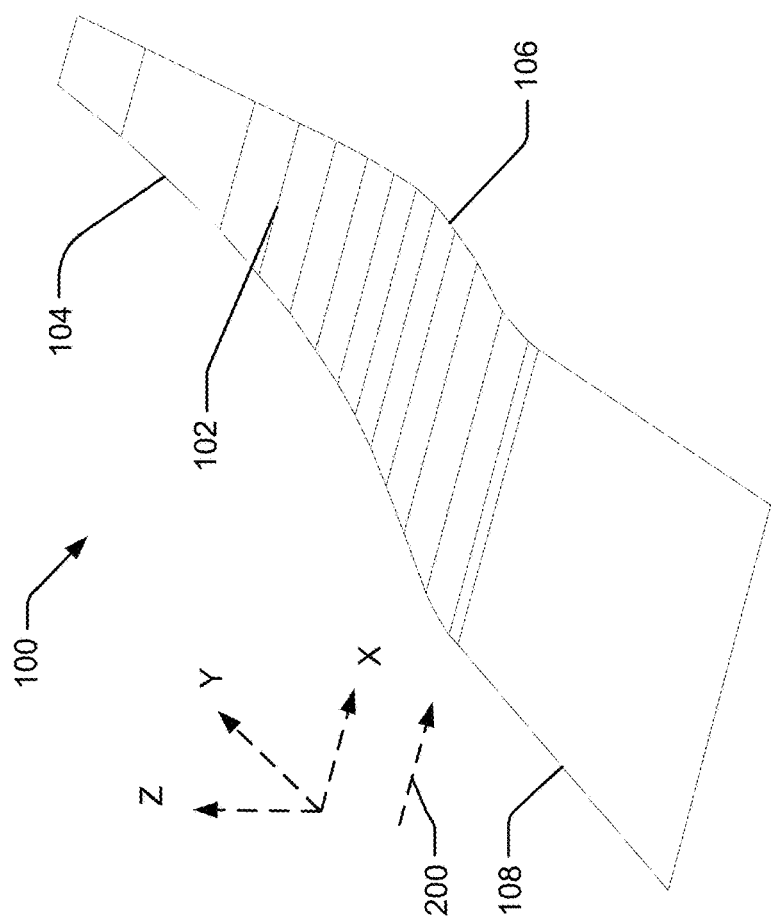
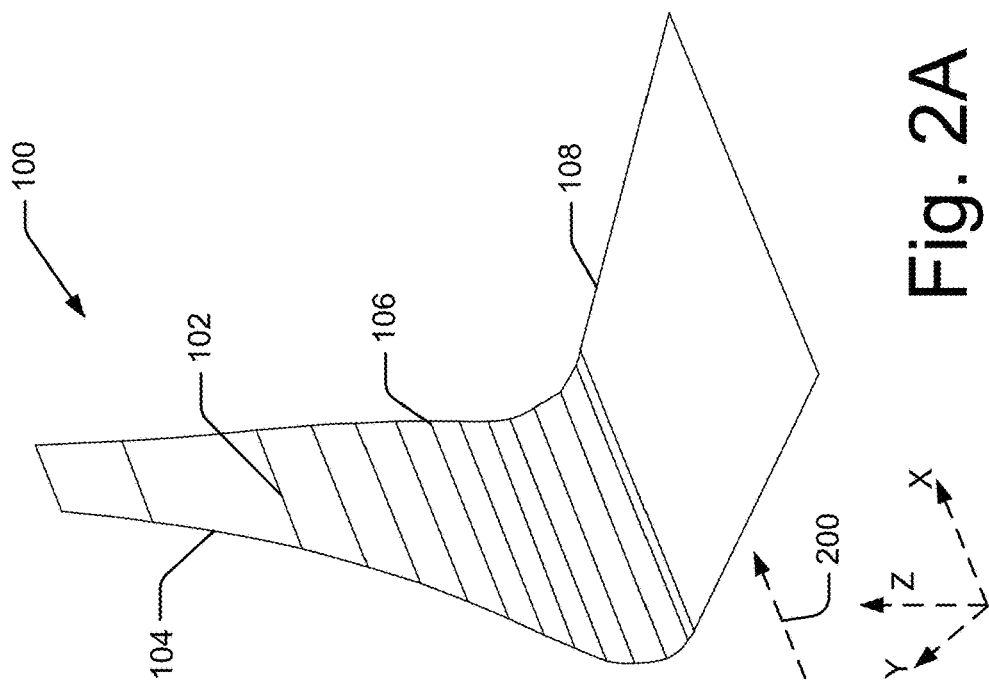

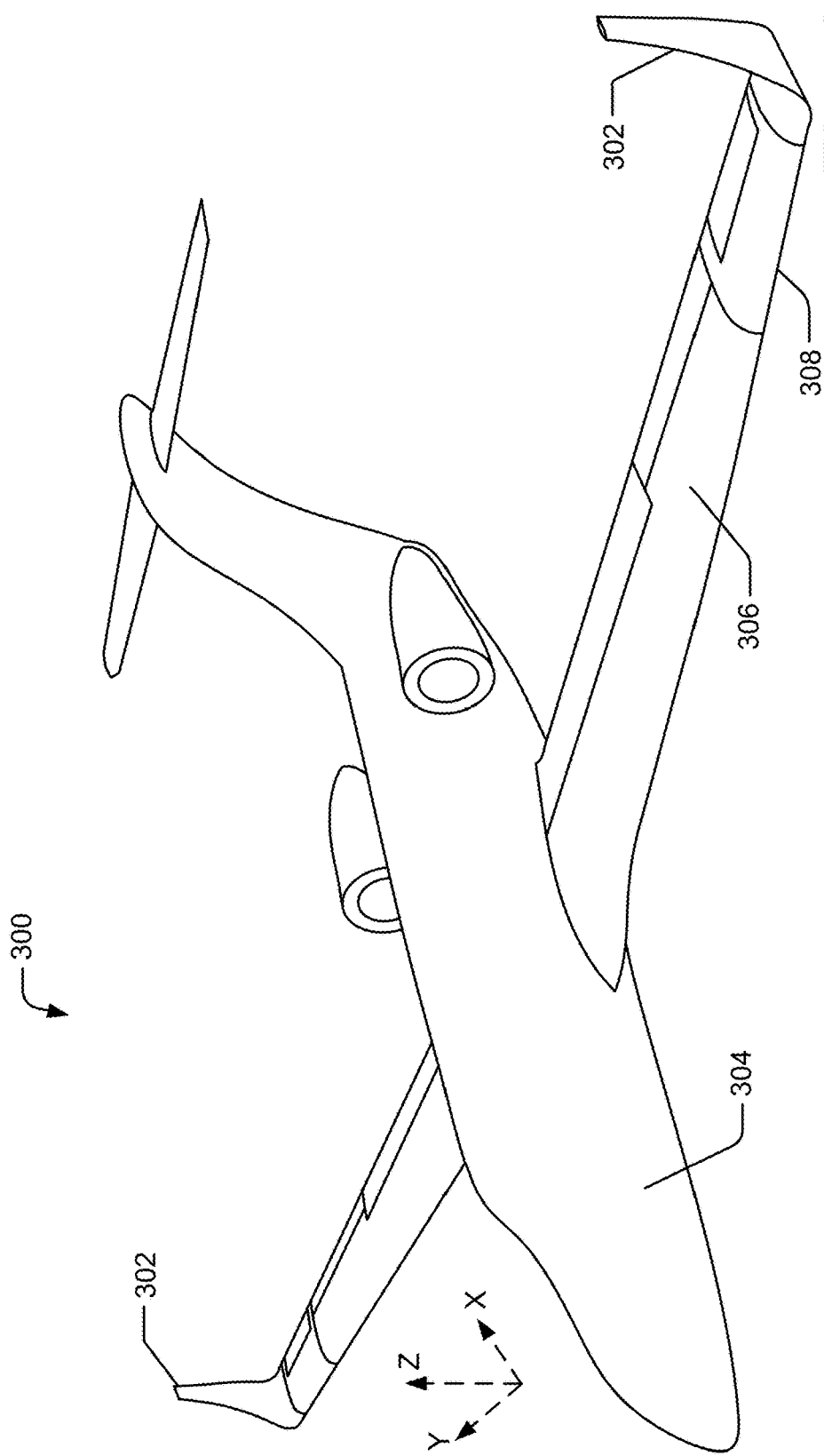

WINGTIP DEVICE

RELATED APPLICATIONS

This application claims the benefit of U.S. Provisional Application No. 61/912,014 filed on Dec. 5, 2013 which is incorporated by reference herein in its entirety.

BACKGROUND

There exists an ever growing need in the aviation industry to increase aircraft efficiencies and reduce the amount of fossil fuels consumed. Winglets have been designed and installed on many aircraft including large multi-passenger aircraft to increase efficiency, performance, and aesthetics. Such winglets usually consist of a horizontal body portion that may attach to the end of a wing and an angled portion that may extend vertically upward from the horizontal body portion. For example, a winglet may be attached to a pre-existing wing of an aircraft to increase flight efficiency, aircraft performance, or even to improve the aesthetics of the aircraft.

However, current winglet designs neglect various design parameters which may cause the winglet to have greater inefficiency than desired. Accordingly, there remains a need in the art for improved aircraft winglets and wingtip devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes a wingtip device and methods for using the wingtip device. For example, wingtip device may be attached to a baseline wing of an aircraft. The wingtip device may comprise a vertical portion coupled to the baseline wing. The vertical portion may comprise a leading edge and trailing edge. The leading edge and trailing edge may be nonlinear shapes. For example, the leading edge and trailing edge may move the wingtip device further aft from a conventional winglet design. Additionally or alternatively, the leading edge and trailing edge may be shaped as to locate the wingtip device further aft than a conventional winglet design.

Additionally or alternatively, the leading and trailing edge may be described by mathematical relationships that may be scaled to suit any aircraft. Additionally or alternatively, the described leading and trailing edges may support various wingtip configurations including, but not limited to, various chords, chamber thicknesses, airfoils, and/or toe angles.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIGS. 1A-C depict an illustrative wingtip device.

FIGS. 2A-B depict another view of the illustrative wingtip device of FIGS. 1A-C.

FIG. 3 depicts an aircraft with attached illustrative wingtip devices.

DETAILED DESCRIPTION

Overview

Figure 4A:
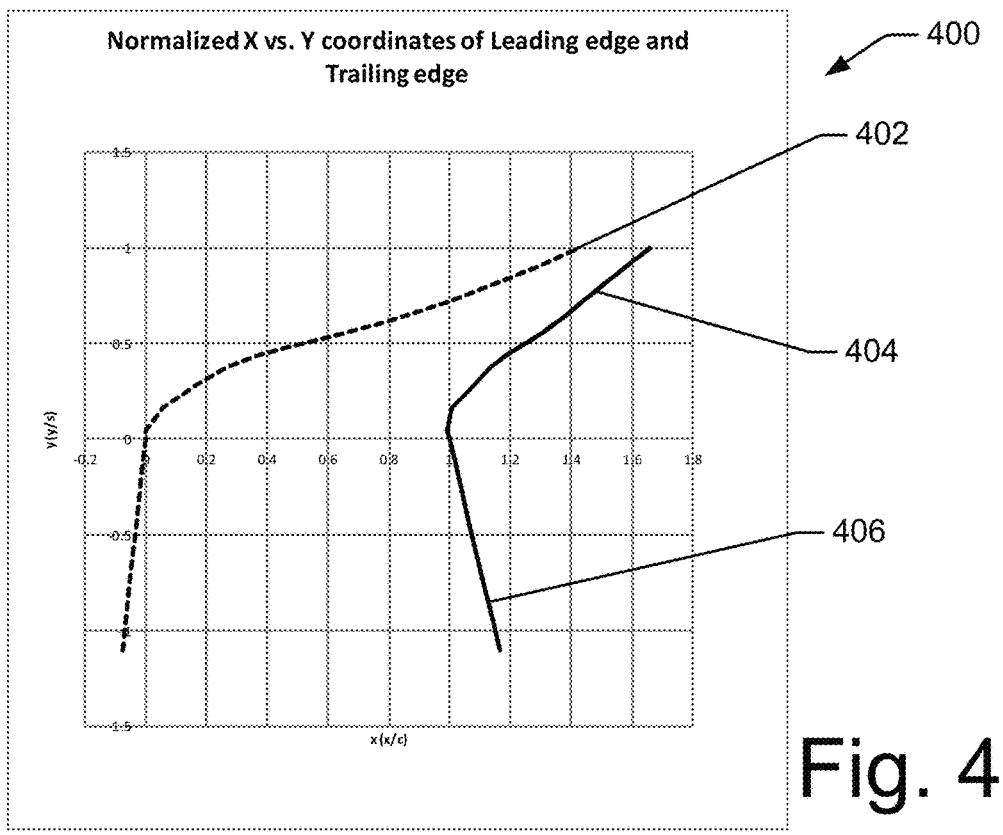
FIGS. 4A-B depict illustrative mathematical relationships between the leading and trailing edges of an illustrative wingtip device.

This application describes a wingtip device that may be used on a wing of an aircraft to increase efficiency and performance of the aircraft in various flight conditions. The disclosed winglet configurations can redistribute the lift across the wing to a more efficient distribution and may reduce drag.

This application also discusses a wingtip device with improved aerodynamic performance. For example, various embodiments contemplate that the wingtip device may comprise unique leading edge design that may be swept back and may place a surface of the wingtip device relatively aft of a portion of the baseline wing with respect to the free stream direction when compared to conventional winglets. By way of a non-limiting example only, various embodiments contemplate that the wingtip device comprises a winglet. Additionally or alternatively, various embodiments contemplate that the wingtip device may comprise surfaces described by mathematical definitions. For example, a mathematical expression may define a shape of the illustrative winglet or a portion thereof.

Additionally or alternatively, various embodiments contemplate that mathematical description may be scalable to fit a wing design or aircraft. Various embodiments contemplate that the mathematical description may define ratios between various reference points on the wingtip device. Various embodiments contemplate that the mathematical description may define a planform or wingtip device shape. Additionally or alternatively, various embodiments contemplate that various airfoils may be incorporated for use with the mathematical description. For example, the mathematical description may be normalized. As such the mathematical model may be scaled for any chord, any chamber thickness, any airfoil, and/or any toe angle. This feature may provide application of the winglet device to any suitable aircraft from a general aviation to a commercial airliner to a military application.

Additionally or alternatively, various embodiments contemplate that the mathematical description may define a coordinate system and reference points, for example x, y, and z, of a leading edge, a respective chord and angle of attack at an airfoil section in the free stream direction.

Often, the trailing edge of a winglet and its interface with the base wing is an area of turbulence and discontinuity. Over the years several shapes have been used to define the spanwise shape of the winglet, for example, angled, blended, or elliptical. However, the relative dimensions and shape in the free-stream direction, for example the x-direction, has not has as much attention. Often, on various winglet installations on existing aircraft this area is either ignored or an afterthought fix is employed. This disclosure addresses a wingtip device shape that may address all three axes. Various embodiments contemplate that the design with the free-stream direction determined and potentially optimized may provide increased efficiency.

Various embodiments contemplate that a wingtip device with leading and trailing edges. Various embodiments contemplate that the leading and trailing edges may be nonlinear. For example the leading and trailing edges may be curved and swept to translate a wingtip device airfoil aft with respect to the baseline wing. Various embodiments contemplate that this region is where a winglet may have better performance. The following discussion with accompanying graphs, figures, tables, and equations disclose various embodiments. However, it is contemplated that these are merely examples, where the underlying principles of nonlinear leading and trailing edges with aft placement of the winglet among other factors represent new and cutting edge design and research in the industry. By way of a non-limiting example, various embodiments described below may follow a blended winglet profile, while the principles discussed herein are readily applicable on a winglet with an angled configuration or an elliptical configuration.

Additionally or alternatively, various embodiments contemplate that the wingtip device may comprise composite and/or metallic material. Various embodiments contemplate that the wingtip device may comprise composite material construction. Various embodiments contemplate that the composite construction may make manufacturing of the wingtip device more commercially economical than other methods, for example, traditional metals and metal working processes.

Various embodiments contemplate that the leading and trailing edges may comprise nonlinear edges and surfaces. Additionally or alternatively, the leading and trailing edges may comprise compound curves. Additionally or alternatively, the leading and trailing edges may comprise smooth continuous higher order functional descriptions, for example, polynomials with orders greater than 2, orders greater than 3, orders greater than 4, orders greater than 5 orders greater than 6, orders greater than 7, orders fewer than or equal to 7, and/or orders equal to 6. Additionally or alternatively, the leading and trailing edges may comprise monotonic functional descriptions. Additionally or alternatively, the leading and trailing edges may comprise differentiable functional descriptions.

Additionally or alternatively, various embodiments contemplate that the wingtip device may be coupled to a wing a various toe angles. For example, the wingtip device may be attached to a baseline wing or adjacent wingtip device at a to angle of zero degrees, between −1 and +1 degrees, between −2 and +2 degrees, between −3 and +3 degrees, between −4 and +4 degrees, or combinations thereof.

Illustrative Wingtip Device

FIG. 1A depicts a side view of an illustrative wingtip device 100. Wingtip device 100 may comprise a substantially vertical portion 102. The vertical portion 102 may comprise a leading edge 104 and a trailing edge 106. Various embodiments contemplate the leading edge 104 and trailing edge 106 may be described with nonlinear mathematical descriptions.

FIG. 1B depicts a profile view of an illustrative wingtip device 100. Wingtip device 100 may comprise a substantially vertical portion 102. The vertical portion 102 may comprise a transition portion 110 and an end 112. The end 112 may comprise a mounting surface or interface to couple to a wingtip of a baseline wing. Additionally or alternatively, this profile view of wingtip device 100 may reflect similarities with a blended winglet profile. Additionally or alternatively, an angled and/or an elliptical profile may also be used.

FIG. 1C depicts top view of an illustrative wingtip device 100. Wingtip device 100 may comprise a substantially vertical portion 102. The vertical portion 102 may comprise a leading edge 104 and a trailing edge 106. Various embodiments contemplate the leading edge 104 and trailing edge 106 may be described with nonlinear mathematical descriptions. FIG. 1B also depicts a portion of a baseline wing or a wingtip extension 108 coupled to the wingtip device 100. Various embodiments contemplate that the wingtip device 100 may be used with various wingtip extensions and devices. For example, a controllable airflow modification device may be coupled to the wingtip device 100. Examples of controllable airflow modification devices (CAMD) may be found in U.S. Pat. No. 7,900,877 and US Patent Application Publication US20120187251.

Additionally or alternatively, various embodiments contemplate that a portion of the leading edge 114 may be located aft of a portion of the trailing edge 116 with respect to a free stream direction, for example X, of the wingtip device 100.

Additionally or alternatively, various embodiments contemplate that a portion of the leading edge may extend past a portion of a trailing edge of the baseline wing or another wingtip device.

Various embodiments contemplate that the portion of the leading edge that is aft of the portion of the trailing edge may comprise greater than one third of the wingtip device length in a direction perpendicular to a free stream direction of the aircraft. Additionally or alternatively, various embodiments contemplate that the portion may comprise greater than one half of the wingtip device length in a direction perpendicular to a free stream direction of the aircraft.

FIGS. 2A-B depict perspective views of an illustrative wingtip device 100. Wingtip device 100 may comprise a substantially vertical portion 102. The vertical portion 102 may comprise a leading edge 104 and a trailing edge 106. Various embodiments contemplate the leading edge 104 and trailing edge 106 may be described with nonlinear mathematical descriptions. FIG. 2A also depicts a portion of a baseline wing or a wingtip extension 108 coupled to the wingtip device 100. FIG. 2A also depicts an arrow 200 representative of the free-stream flow of an aircraft (not pictured).

FIG. 3 depicts an illustrative aircraft 300 with illustrative wingtip devices 302. Aircraft 300 may comprise a fuselage 304 with baseline wings 306 that may be coupled to wingtip devices 302. Additionally or alternatively, the wingtip devices 302 may be coupled directly to the baseline wing 306. Various embodiments contemplate that the baseline wing 306 may have additional wingtip devices, extensions, or other features. For example, FIG. 3 shows an additional wingtip device 308 where the wingtip device 302 may be coupled directly to the additional wingtip device 308 which is coupled to the baseline wing 306. Various embodiments contemplate that the additional wingtip devices 308 may comprise one or more active or passive wingtip devices. For example, various embodiments contemplate that the another wingtip device 308 comprises one or more CAMDs.

Figure 4B:
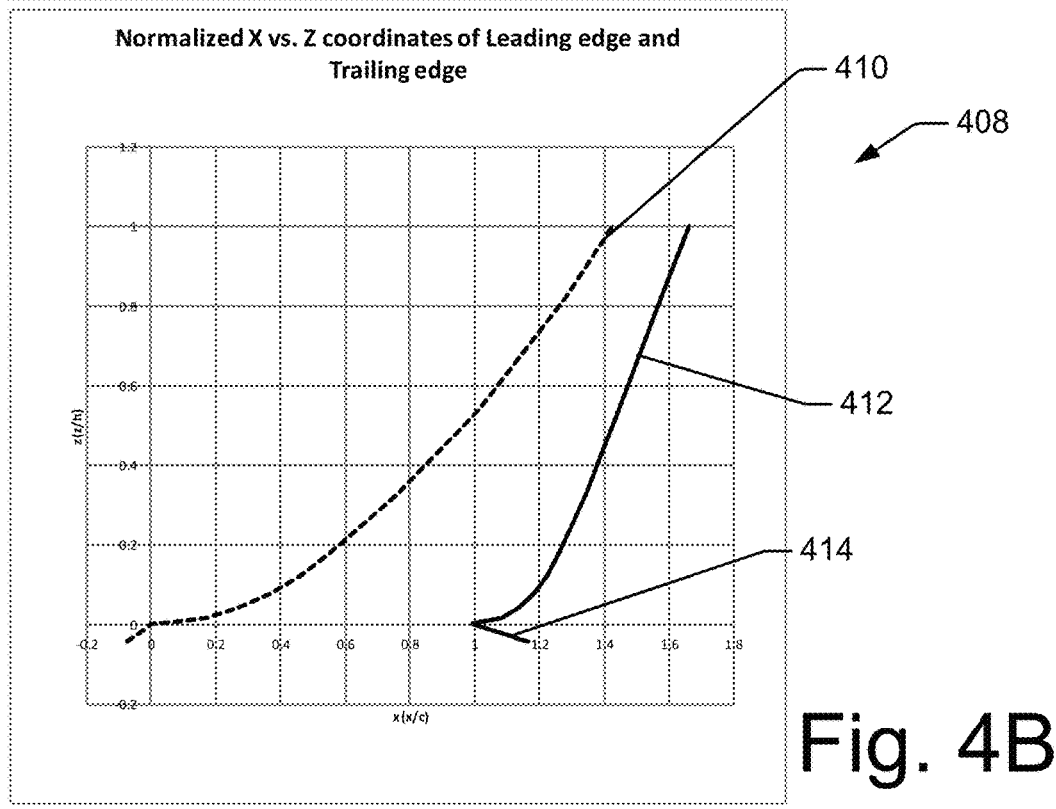

FIGS. 4A-B depict illustrative mathematical relationships between the leading and trailing edges of an illustrative wingtip device. For example, FIG. 4A depicts a profile view 400 from above the wingtip device. The leading edge may be defined by the line 402 in the positive region of the Y-axis. Various embodiments contemplate that the portion of the line 402 in the negative region of the Y-axis may illustrate a leading edge of a wing or another wingtip device. The trailing edge may be defined by the line 404 in the positive region of the Y-axis. Various embodiments contemplate that the portion of the line 404 in the negative region of the Y-axis may illustrate a trailing edge of a wing or another wingtip device. Additionally or alternatively, while FIG. 4A shows the portion of line 404 in negative region of the Y-axis having a slope 406 that is negative, various embodiments contemplate that the slope 406 may be substantially vertical, having a positive slope, or combinations thereof. This may dependent on the configuration of the trailing edge of the adjacent wing structure. For example, if the wing is swept, the slope 406 may be negative, if the wing is a delta wing or a straight wing, the slope 406 may be substantially vertical, and if the wing is tapered, the slope 406 may be positive.

FIG. 4B depicts a profile view 408 from inboard of the wingtip device. The leading edge may be defined by the line 410 in the positive region of the Z-axis. Various embodiments contemplate that the portion of the line 410 in the negative region of the Z-axis may illustrate a leading edge of a wing or another wingtip device. The trailing edge may be defined by the line 412 in the positive region of the Z-axis. Various embodiments contemplate that the portion of the line 412 in the negative region of the Z-axis may illustrate a trailing edge of a wing or another wingtip device. Additionally or alternatively, while FIG. 4B shows the portion of line 412 in negative region of the Z-axis having a slope 414 that is negative, various embodiments contemplate that the slope 414 may be substantially vertical, having a positive slope, or combinations thereof.

Figure 5A:
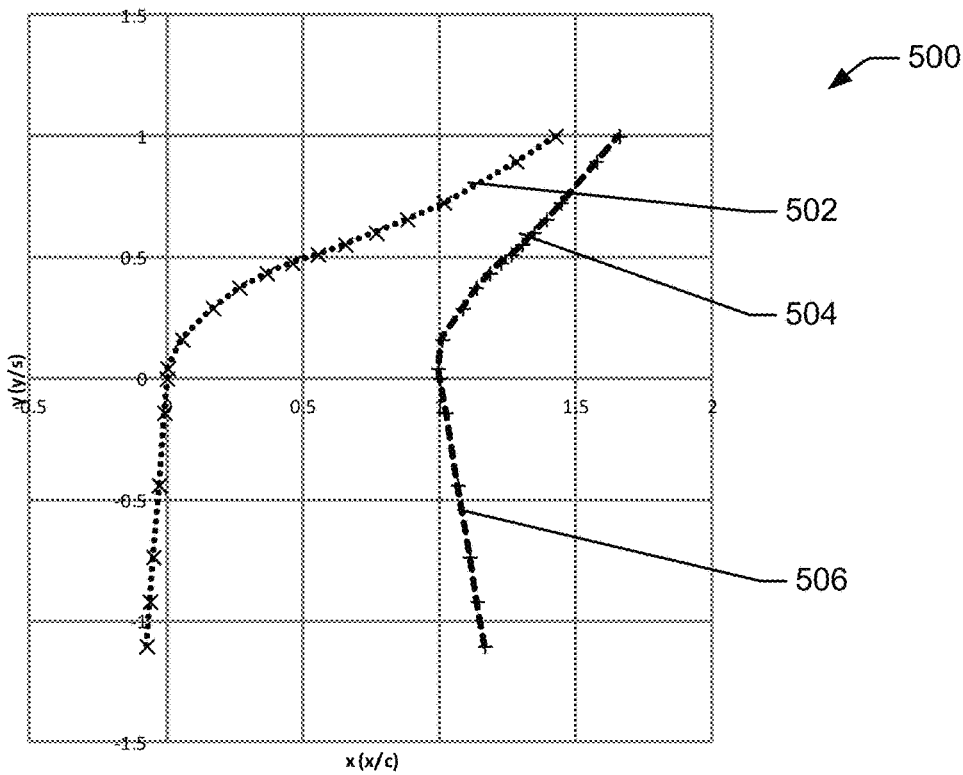
FIGS. 5A-B depict an illustrative mathematical relationship between the leading and trailing edges of an illustrative wingtip device.
Figure 5B:
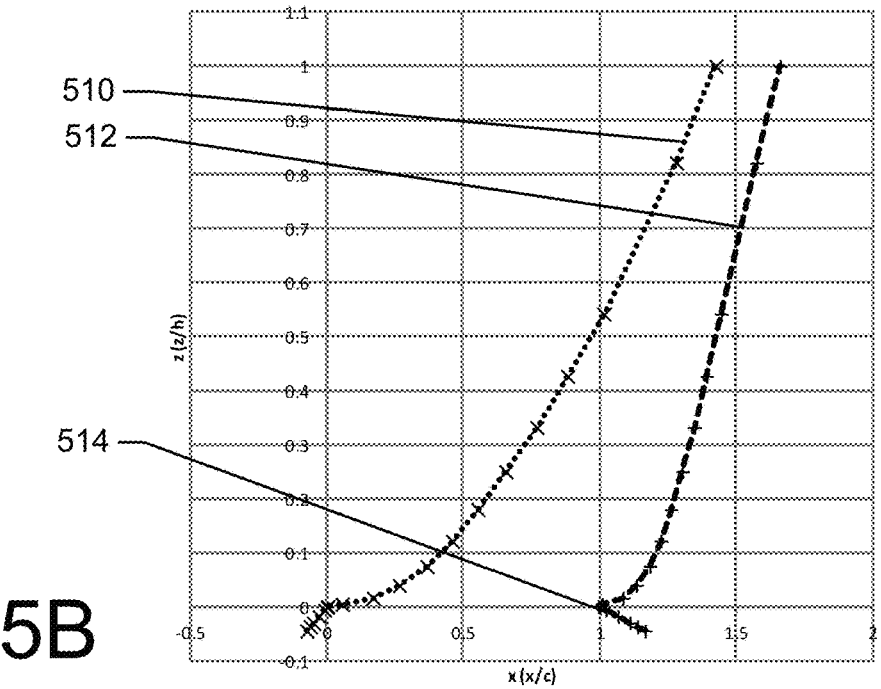

FIGS. 5A-B depict an illustrative mathematical relationship between the leading and trailing edges of an illustrative wingtip device. For example, FIG. 5A depicts a profile view 500 from above the wingtip device. The leading edge may be defined by the line 502 in the positive region of the Y-axis. Various embodiments contemplate that the portion of the line 502 in the negative region of the Y-axis may illustrate a leading edge of a wing or another wingtip device. The trailing edge may be defined by the line 504 in the positive region of the Y-axis. Various embodiments contemplate that the portion of the line 504 in the negative region of the Y-axis may illustrate a trailing edge of a wing or another wingtip device. Additionally or alternatively, while FIG. 5A shows the portion of line 504 in negative region of the Y-axis having a slope 506 that is negative, various embodiments contemplate that the slope 506 may be substantially vertical, having a positive slope, or combinations thereof. This may dependent on the configuration of the trailing edge of the adjacent wing structure. For example, if the wing is swept, the slope 506 may be negative, if the wing is a delta wing or a straight wing, the slope 506 may be substantially vertical, and if the wing is tapered, the slope 506 may be positive.

FIG. 5B depicts a profile view 508 from inboard of the wingtip device. The leading edge may be defined by the line 510 in the positive region of the Z-axis. Various embodiments contemplate that the portion of the line 510 in the negative region of the Z-axis may illustrate a leading edge of a wing or another wingtip device. The trailing edge may be defined by the line 512 in the positive region of the Z-axis. Various embodiments contemplate that the portion of the line 512 in the negative region of the Z-axis may illustrate a trailing edge of a wing or another wingtip device. Additionally or alternatively, while FIG. 5B shows the portion of line 512 in negative region of the Z-axis having a slope 514 that is negative, various embodiments contemplate that the slope 514 may be substantially vertical, having a positive slope, or combinations thereof.

Additionally or alternatively, FIGS. 5A-B depict illustrative reference points. Various embodiments contemplate that the reference points may be described by the mathematical descriptions of Equation (1)

$$C_6 x^6 + C_5 x^5 + C_4 x^4 + C_3 x^3 + C_2 x^2 + C_1 x + C_0 = \text{Point}_{Ref} \qquad (1)$$

Various embodiments contemplate that the coefficients may be reduced according to the above equation to result in the x,y,z coordinates described in Tables 1 and 2.

TABLE 1

Illustrative distribution of scalable loft points for a leading edge

| XLE | YLE | ZLE |
|---|---|---|
| -0.074330137 | -1.10464234 | -0.043561841 |
| -0.061900391 | -0.919991901 | -0.036291673 |
| -0.049534337 | -0.736195865 | -0.029082663 |
| -0.029537726 | -0.439002734 | -0.017320594 |
| -0.009541118 | -0.141809602 | -0.005558526 |
| 0 | 0 | 0 |
| 0.002824942 | 0.041986434 | 0.001650484 |
| 0.056073211 | 0.161285237 | 0.005501613 |
| 0.169016473 | 0.290279703 | 0.017017057 |
| 0.266105007 | 0.375854463 | 0.040541194 |
| 0.366881392 | 0.435477728 | 0.075637689 |
| 0.460780475 | 0.477884785 | 0.122496252 |
| 0.55437632 | 0.512651088 | 0.180927172 |
| 0.655358752 | 0.55441585 | 0.251120161 |
| 0.767980892 | 0.603066153 | 0.332885508 |
| 0.881038451 | 0.658714876 | 0.426412924 |
| 1.015115008 | 0.727407844 | 0.541863015 |
| 1.280481023 | 0.897814111 | 0.821746929 |
| 1.426104752 | 1 | 1 |

TABLE 2

Illustrative distribution of scalable loft points for a trailing edge

| XTE | YTE | ZTE |
|---|---|---|
| 1.165444499 | -1.10464234 | -0.043561841 |
| 1.13777829 | -0.919991901 | -0.036291673 |
| 1.110253846 | -0.736195865 | -0.029082663 |
| 1.065745261 | -0.439002734 | -0.017320594 |
| 1.021236682 | -0.141809602 | -0.005558526 |
| 1 | 0 | 0 |
| 0.993712225 | 0.041986434 | 0.001650484 |
| 1.008554285 | 0.161285237 | 0.005501613 |
| 1.084253593 | 0.290279703 | 0.017017057 |
| 1.133931896 | 0.375854463 | 0.040541194 |
| 1.183441811 | 0.435477728 | 0.075637689 |
| 1.224724447 | 0.477884785 | 0.122496252 |
| 1.262244703 | 0.512651088 | 0.180927172 |
| 1.302839016 | 0.55441585 | 0.251120161 |
| 1.346199608 | 0.603066153 | 0.332885508 |

Various embodiments contemplate that the values in tables 1 and 2 may be scaled by multiplying a sizing factor to allow the distance from the leading edge to the trailing edge at a location where the wingtip device attaches to a wing or wing extension of an aircraft.

Tables 1 and 2 show illustrative loft data of a wingtip device. Tables 1 and 2 also show loft data associated with a portion of a wing or wing extension. For example, loft data shown above the dividing horizontal line in Tables 1 and 2 may be representative of a wing tip loft data. For example, the location data for the illustrative leading edge data in Table 1 show negative values for each point. One of ordinary skill in the art will appreciate that the coordinate system shown is illustrative, not limiting, and chosen for convenience and clarity. For example, the coordinate system may be arbitrarily translated and/or rotated in any direction or axis with respect to the illustrative wingtip device without affecting the illustrative features.

Figure 6A:
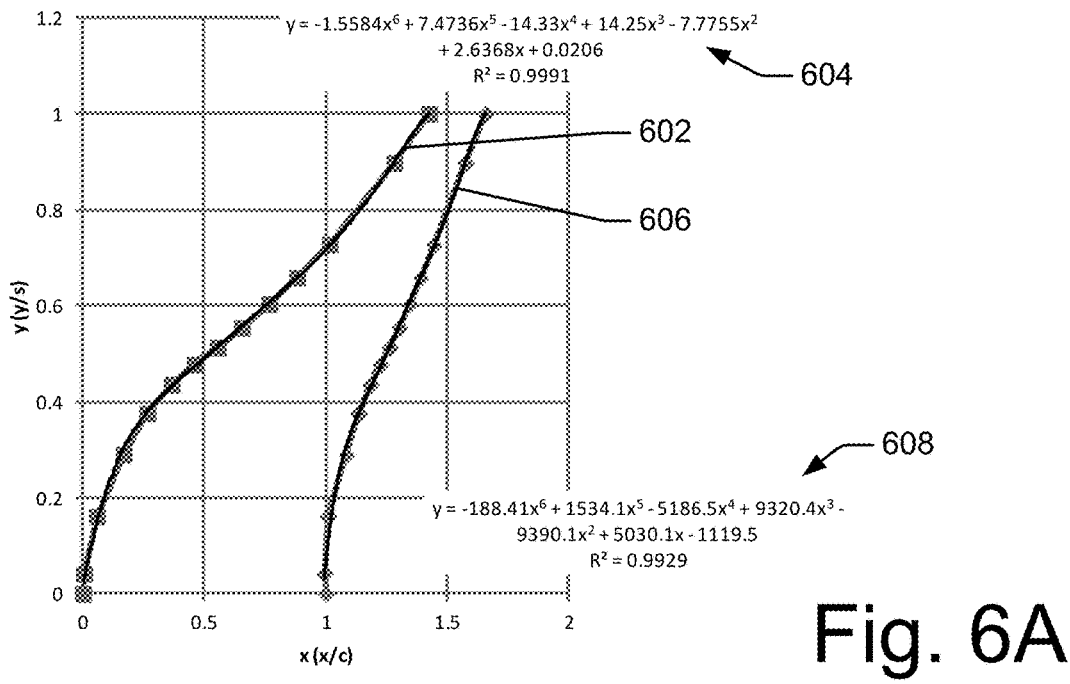
FIGS. 6A-B depict an illustrative mathematical relationship between the leading edges and trailing edges of an illustrative wingtip device as shown in FIGS. 5A-B.
Figure 6B:
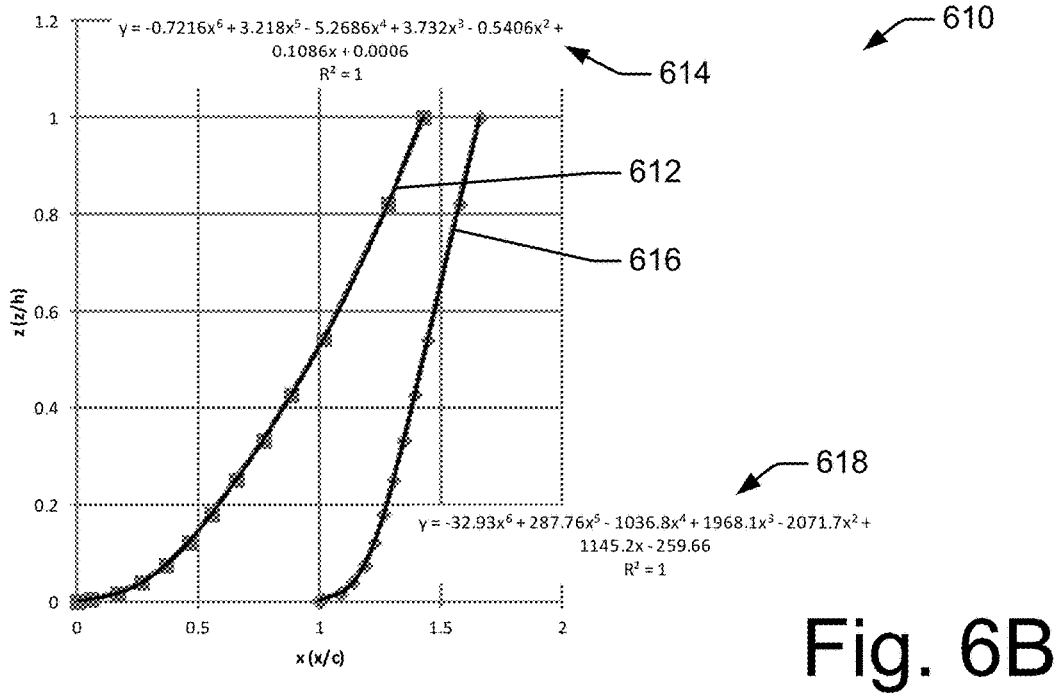

FIGS. 6A-B depict an illustrative mathematical relationship between the leading edges and trailing edges of an illustrative wingtip device as shown in FIGS. 5A-B. FIGS. 6A-B show additional embodiments where the leading edge and trailing edge are defined by a polynomial fitted to the points of tables 1 and 2. For example, FIG. 6A depicts a profile view 600 from above the wingtip device. The leading edge may be defined by the line 602 in the positive region of the Y-axis. Various embodiments contemplate that the leading edge may be defined by the loft data shown in Tables 1 and 2 where the adjacent data points may be connected by various methods. For example, the loft data may be connected by splines where the curve runs through the enumerated point. Additionally or alternatively, various embodiments contemplate that the curves may be defined by higher order equations. For example, the leading edge may be defined by illustrative higher order equation 604. It is understood that the equation 604 is illustrative and other higher or lower order equations are part of the present disclosure.

The trailing edge may be defined by the line 606 in the positive region of the Y-axis. Various embodiments contemplate that the leading edge may be defined by the loft data shown in Tables 1 and 2 where the adjacent data points may be connected by various methods. For example, the loft data may be connected by splines where the curve runs through the enumerated point. Additionally or alternatively, various embodiments contemplate that the curves may be defined by higher order equations. For example, the trailing edge may be defined by illustrative higher order equation 608. It is understood that the equation 608 is illustrative and other higher or lower order equations are part of the present disclosure.

FIG. 6B depicts a profile view 610 from inboard of the wingtip device. The leading edge may be defined by the line 612 in the positive region of the Z-axis. Various embodiments contemplate that the leading edge may be defined by the loft data shown in Tables 1 and 2 where the adjacent data points may be connected by various methods. For example, the loft data may be connected by splines where the curve runs through the enumerated point. Additionally or alternatively, various embodiments contemplate that the curves may be defined by higher order equations. For example, the leading edge may be defined by illustrative higher order equation 614. It is understood that the equation 614 is illustrative and other higher or lower order equations are part of the present disclosure.

The trailing edge may be defined by the line 616 in the positive region of the Z-axis. Various embodiments contemplate that the trailing edge may be defined by the loft data shown in Tables 1 and 2 where the adjacent data points may be connected by various methods. For example, the loft data may be connected by splines where the curve runs through the enumerated point. Additionally or alternatively, various embodiments contemplate that the curves may be defined by higher order equations. For example, the trailing edge may be defined by illustrative higher order equation 618. It is understood that the equation 618 is illustrative and other higher or lower order equations are part of the present disclosure.

Illustrative Wingtip Devices

Figure 7:
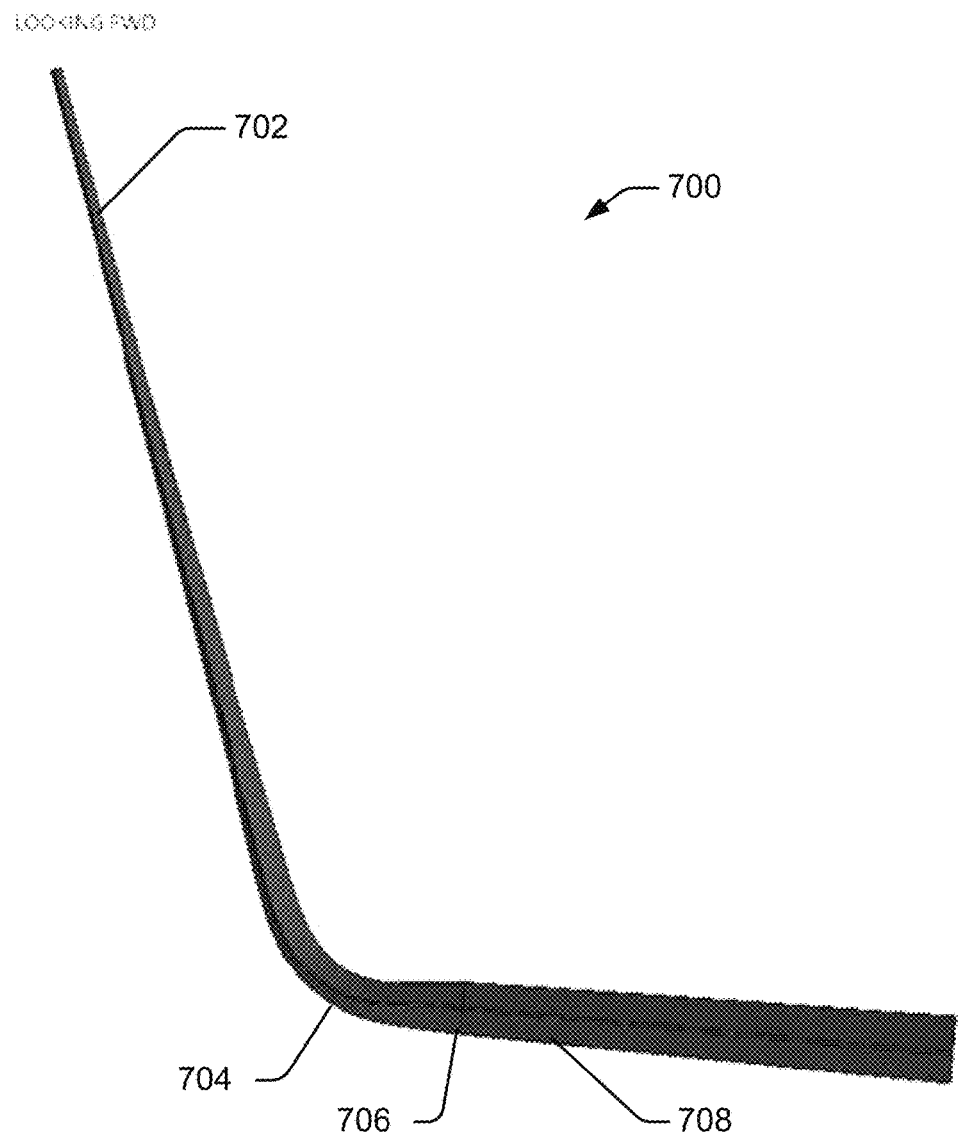
FIGS. 7-10 depict illustrative embodiments of a wingtip device.

FIGS. 7-10 depict illustrative embodiments of a wingtip device. For example, FIGS. 7-10 depict the loft data contained in Tables 1 and 2 with an illustrative airfoil following the contours of the loft data. For example, FIG. 7 shows a profile view of an illustrative wingtip device 700. Wingtip device 700 may comprise a substantially vertical portion 702. The vertical portion 702 may comprise a transition portion 704 and an end 706. The end 706 may comprise a mounting surface or interface to couple to a wingtip of a baseline wing 708. Additionally or alternatively, this profile view of wingtip device 700 may reflect similarities with a blended winglet profile. Additionally or alternatively, an angled and/or an elliptical profile may also be used.

Figure 8:
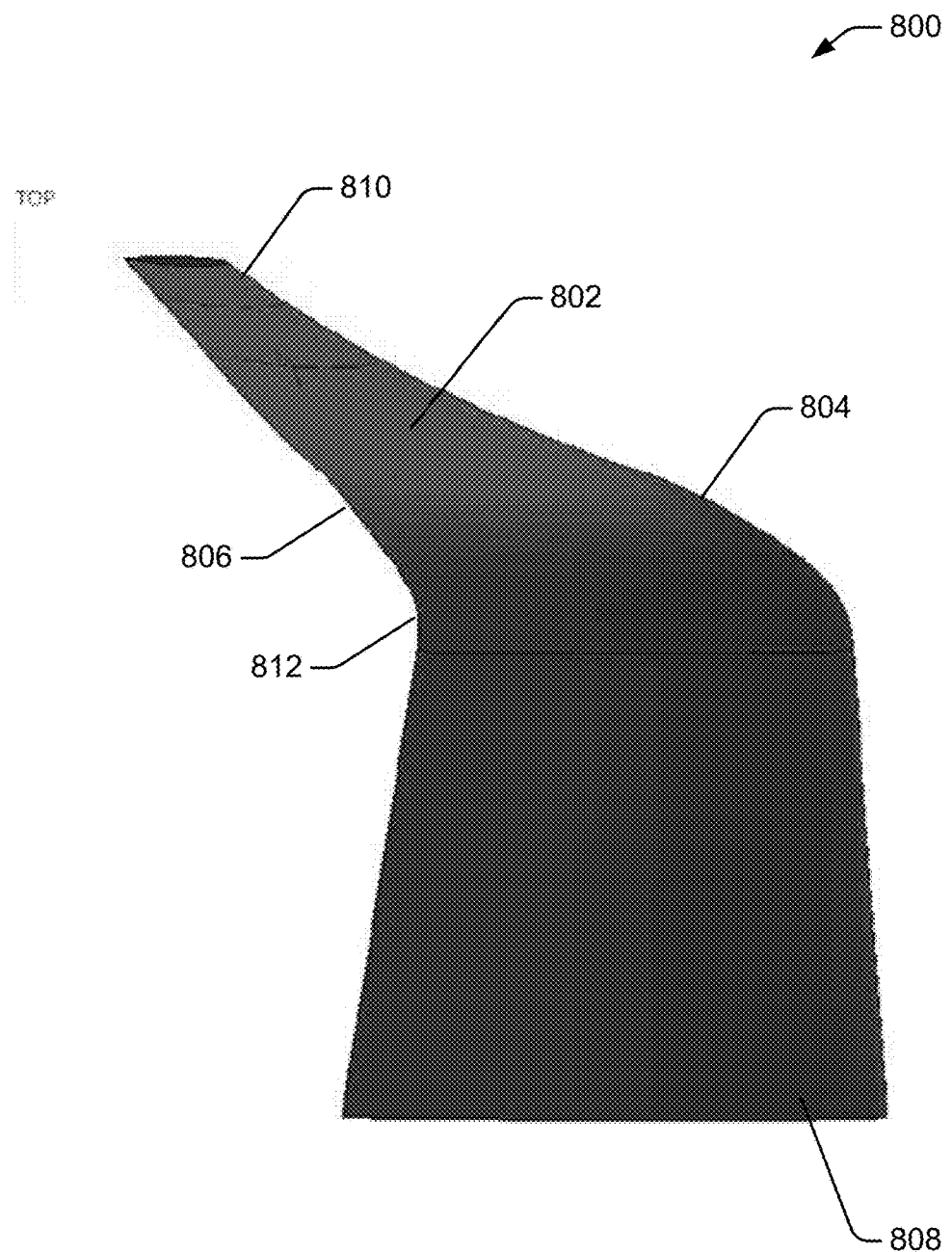

Additionally or alternatively, various embodiments contemplate that the relative thickness of the wingtip device may be different from the wing or other wingtip devices. For example, various embodiments contemplate reducing the thickness to chord ratio by 2% from the thickness to chord ratio of an adjoining structure and/or the baseline wing. For example, if a baseline wing has a thickness to chord ratio 11%, the wingtip device may have a thickness to chord ratio of 9% or less. FIG. 8 depicts top view of an illustrative wingtip device 800. Wingtip device 800 may comprise a substantially vertical portion 802. The vertical portion 802 may comprise a leading edge 804 and a trailing edge 806. Various embodiments contemplate the leading edge 804 and trailing edge 806 may be described with nonlinear mathematical descriptions. FIG. 8 also depicts a portion of a baseline wing or a wingtip extension 808 coupled to the wingtip device 800. Various embodiments contemplate that the wingtip device 800 may be used with various wingtip extensions and devices. For example, a CAMD may be coupled to the wingtip device 800.

Additionally or alternatively, various embodiments contemplate that a portion of the leading edge 810 may be located aft of a portion of the trailing edge 812 with respect to a free stream direction of the wingtip device 800.

Figure 9:
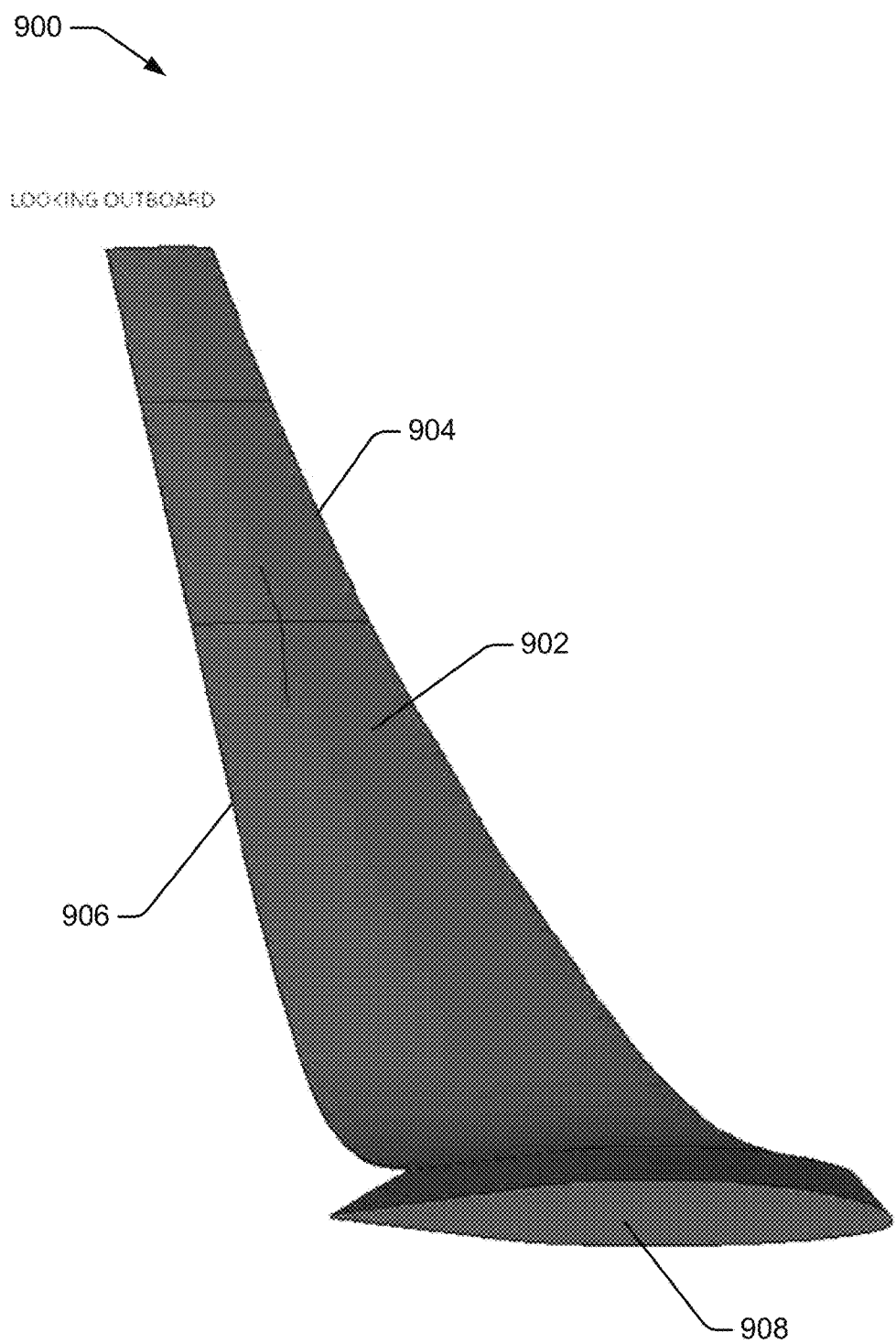

FIG. 9 depicts a side view of an illustrative wingtip device 900. Wingtip device 900 may comprise a substantially vertical portion 902. The vertical portion 902 may comprise a leading edge 904 and a trailing edge 906. Various embodiments contemplate the leading edge 904 and trailing edge 906 may be described with nonlinear mathematical descriptions. FIG. 9 also depicts a portion of a baseline wing or a wingtip extension 908 coupled to the wingtip device 900.

Figure 10:
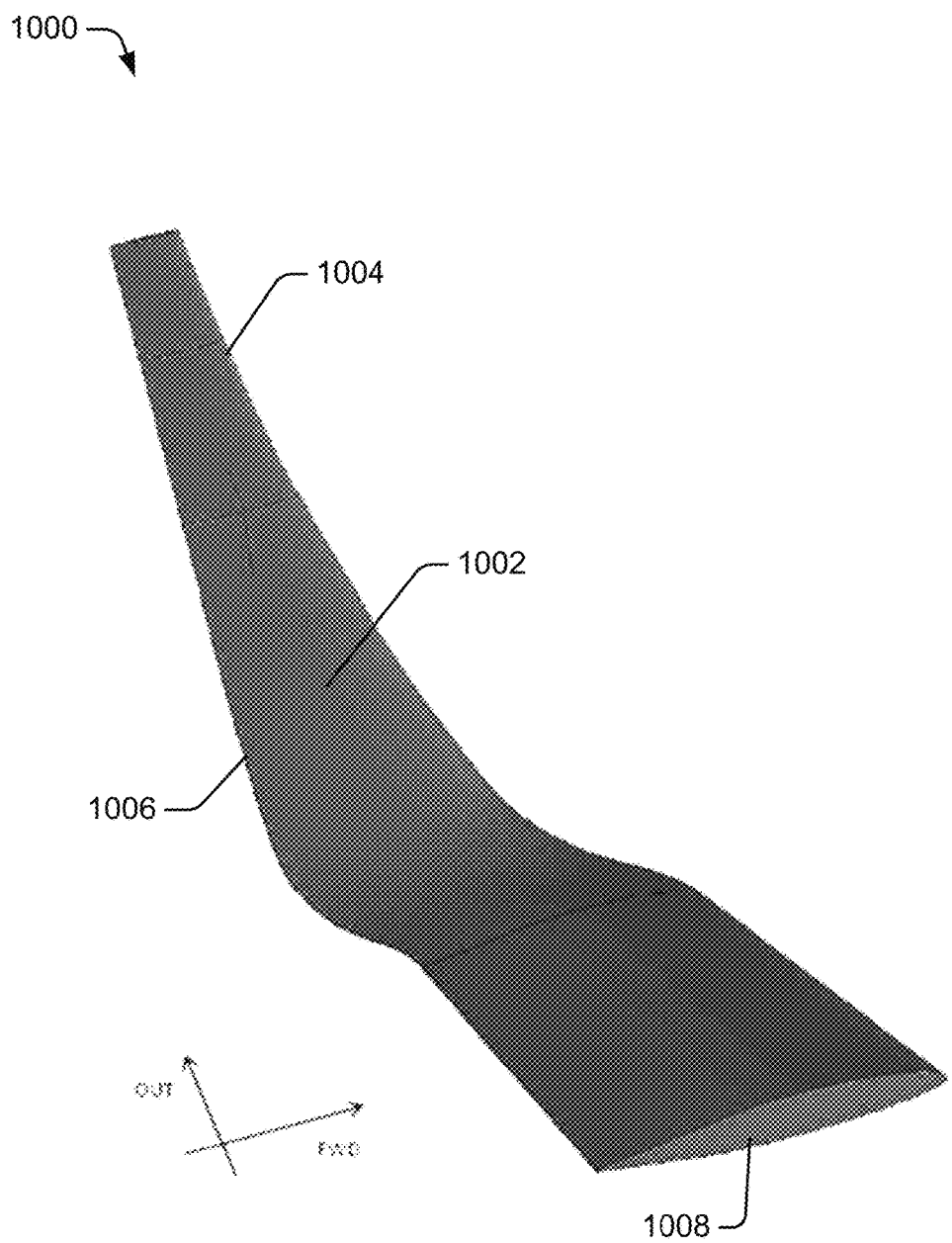

FIG. 10 depicts a perspective view of an illustrative wingtip device 1000. Wingtip device 1000 may comprise a substantially vertical portion 1002. The vertical portion 1002 may comprise a leading edge 1004 and a trailing edge 1006. Various embodiments contemplate the leading edge 1004 and trailing edge 1006 may be described with nonlinear mathematical descriptions. FIG. 10 also depicts a portion of a baseline wing or a wingtip extension 1008 coupled to the wingtip device 1000.

Illustrative Methods

Figure 11:
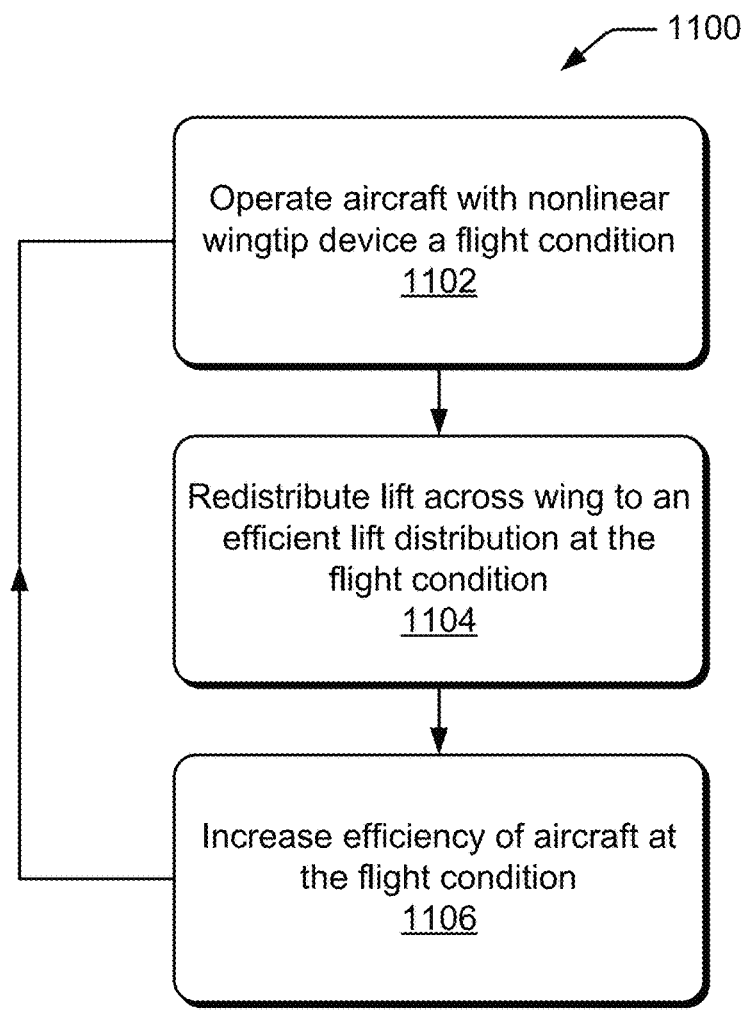
FIG. 11 depicts a flowchart illustrating operation of a wingtip device.

FIG. 11 is a flowchart of one illustrative method 1100 of operating an aircraft with wingtip devices. For example, at 1102, an aircraft is operated at a flight condition. The aircraft may have a wingtip device as discussed with respect to FIGS. 1-10 and/or Tables 1 and 2. For example, the wingtip device may have a leading edge defined by a smooth continuous higher order function. The wingtip device may have a trailing edge defined by another smooth continuous higher order function.

Additionally or alternatively, a portion of the leading edge being located aft of a portion of the trailing edge. Various embodiments contemplate that the portion of the trailing edge may be substantially near a root of the winglet and the portion of the leading edge may be substantially near a tip of the wingtip device substantially outboard of the root.

Various embodiments contemplate that the wingtip device may comprise a winglet.

At 1104, the lift across the wing may be distributed (or redistributed when compared to an aircraft with different wingtip devices or no wingtip devices) to create an efficient lift distribution. An efficient lift distribution may mean a lift distribution that is more efficient than an alternative lift distribution. For example, a wing in a given flight condition without any wingtip device may have a first lift distribution and the same wing in the same flight condition with a wingtip device as described above may provide a second lift distribution. The second lift distribution may be more efficient than the first lift distribution.

At 1106, the efficiency of the aircraft may be increased at the flight condition based at least in part on the efficient lift distribution.

CONCLUSION

Although embodiments have been described in language specific to structural features and/or methodological acts, it is to be understood that the disclosure and appended claims are not necessarily limited to the specific features or acts described. Rather, the specific features and acts are disclosed as illustrative forms of implementing the embodiments. For example, the methodological acts need not be performed in the order or combinations described herein, and may be performed in any combination of one or more acts.

What is claimed is:

1. A winglet fixedly attachable to a baseline wing of an aircraft comprising:
a vertical portion having a leading edge and a trailing edge, the leading edge having a first nonlinear shape and the trailing edge having a second nonlinear shape, a portion of the leading edge of the winglet extending past a portion of a trailing edge of the baseline wing, the portion of the leading edge comprising greater than one third of the winglet length in a direction perpendicular to a free stream direction of the aircraft.

2. The winglet of claim 1, the first nonlinear shape defined by a first compound curve.

3. The winglet of claim 1, the second nonlinear shape defined by a second compound curve.

4. The winglet of claim 1, the first nonlinear shape defined by a first smooth continuous higher order function.

5. The winglet of claim 1, the second nonlinear shape defined by a second smooth continuous higher order function.

6. The winglet of claim 1, the first nonlinear shape defined by one or more of a smooth continuous 5th order function, a smooth continuous 6th order function, or a smooth continuous 7th order function.

7. The winglet of claim 1, the second nonlinear shape defined by one or more of a smooth continuous 5th order function, a smooth continuous 6th order function, or a smooth continuous 7th order function.

* * * * *